Patented Mar. 16, 1948

2,438,055

UNITED STATES PATENT OFFICE 2,438,055

PREPARATION OF SALTS OF MONO-ORGANO SILANOLS

James Franklin Hyde and Oscar Kenneth Johannson, Corning, N. Y., assignors to Corning Glass Works, Corning, N. Y., a corporation of New York No Drawing. Application January 10, 1947, Serial No. 721,460

6 Claims. (Cl. 260—462)

The present invention relates to certain new organo-silicon compositions and to methods for their production.

There has been some mention in the literature of sodium salts of siliconic acid. Ladenburg mentions the sodium salt of ethyl siliconic acid, $C_2H_5SiOONa$, Ann. 173, 148. Meads & Kipping mention the sodium salt of phenyl siliconic acid (Jour. Chem. Soc. 105, 679), and of propyl siliconic acid and benzyl siliconic acid (Jour. Chem. Soc. 107, 459). It is to be noted that the literature references to the salts of the mono-organo substituted silicic acids all disclose acids of structure similar to the carboxylic acids which would necessitate a double bond between silicon and oxygen. It is to be noted that such bonding has never been established. It is further to be noted that each of the salts described in the literature is a simple salt and in no instance is the salt a complex with other materials.

Objects of the present invention are to provide methods for the production of organosilicon salt complexes which contain water of hydration, and methods for the production of the anhydrous salts through the hydrates.

In accordance with this invention, a mono-organo silicon containing material is reacted with alkali metal hydroxide in the presence of water and an alcohol which boils below the boiling point of water. A single phase system is obtained from which complex salts containing water of crystallization are crystallized. Anhydrous salts may be obtained by the dehydration of the complexes.

The organosilicon material which is reacted with the alkali metal hydroxide contains silicon atoms which have a single organic radical bonded thereto by carbon to silicon bond. These radicals which are bonded to the silicon are selected from the group consisting of methyl, ethyl, and phenyl. The organosilicon material may be either an ester or a chloride, as for example, methyl triethoxy silane and methyl trichlor silane. When either of these types of materials is employed in the process hereof, hydrolysis of the esters or chlorides occurs initially. Accordingly, the hydrolyzates of these materials may likewise be employed. In case the chloride is to be employed for the preparation of the compositions hereof, it is preferable to hydrolyze the silane before reacting it with the alkali metal hydroxide, inasmuch as the product would contain the alkali metal chloride as an impurity or the removal thereof would be necessary. In any instance, the hydrolyzate of the ester or the chloride is reacted with the alkali metal hydroxide.

The alkali metal hydroxide, preferably either potassium hydroxide or sodium hydroxide, is reacted with the hydrolyzate in amount between 1 and 3 mols, inclusive, of the alkali metal hydroxide per atom of silicon. In order to effect the interaction satisfactorily the two are reacted in the presence of between 0.5 and 4 mols of water per mol of alkali metal hydroxide and sufficient alcohol to dissolve insoluble solid material.

Solid crystalline material is crystallized from a solution so prepared. This product is a complex of the salt with water of crystallization.

The alcohol which is employed is one which boils below water. The preferred alcohols are methyl, ethyl, and propyl. The alcohol is employed in amount sufficient to bring the reactants into a single phase. Warming is frequently desirable to increase the solubility of the salts in the solvent present.

Crystallization of the complex may be effected by any of the methods which are well-known in the art for the crystallization of salts from solutions. Thus, the solubility may be decreased by evaporation of alcohol from the solution. Inasmuch as the alcohol employed is one which boils below water, removal of the alcohol present without substantial removal of the water may be effected by evaporation, preferably under vacuum. Alternatively, the solubility of the salt complex in the menstruum may be decreased by addition of a material in which the salt is less soluble, for example, diethyl ether. The salt may likewise be crystallized by concentrating a warm solution to the point that upon cooling it crystallizes. Isopropanol is particularly desirable for this type of crystallization, since the salts are much more soluble in hot than in cold isopropanol. It is to be noted that isopropanol may be added to ethanol solutions of the salts to effect crystallization thereof based upon the limited solubility in cold isopropanol.

Salts prepared in accordance herewith are well crystallized species. Those salts which contain one atom of alkali metal per atom of silicon are assumed to be cyclic siloxane salts in which each silicon is linked to one organic radical and to one oxygen which in turn is linked to alkali metal. Those salts which contain two atoms of alkali metal per atom of silicon are assumed to be disiloxanes in which each silicon carries one organic radical and two oxygen atoms, each of which in turn is linked to an alkali metal atom. Those which contain 3 alkali metal atoms per silicon are assumed to be the simple silane salts in which the silicon carries one organic radical and three oxygens each of which is in turn bonded to alkali metal. Mixtures of these types of salts may likewise be obtained as by the use of intermediate proportions of alkali metal hydroxide.

The salts hereof may be employed for the production of other metallic salts of the organosilicon materials, by reacting the present salts with salts of the desired materials such as for example, the chlorides of copper, calcium, aluminum, titanium, zirconium, tin, lead, vanadium, chromium, manganese, iron, cobalt, and nickel.

The hydrated salts above described are of utility in the production of high molecular weight siloxanes. Thus, they may be employed as a source of alkali catalyst in the polymerization of diorgano siloxanes. These hydrates are of interest for this purpose due to their ready solubility in siloxanes such as octamethyl cyclotetrasiloxane. Variation in the relative proportions of alkali metal and mono-organosiloxane units which are introduced into the siloxane being polymerized may be obtained by variation of the ratio of alkali metal to silicon in the salt. For purposes of catalytic polymerization of a siloxane in which the average molecular weight is less than that equivalent to 25 organosiloxane polymer units, the salt is introduced in amount less than equivalent to one atom of alkali per fifty atoms of silicon. In order to neutralize the alkali in the polymer so produced and thereby stabilize the system it is only necessary to introduce an organosilicon halide such as trimethyl silicon chloride in amount at least equivalent to the alkali present.

High molecular weight siloxanes may also be produced by progressive neutralization of the salts. Thus, if a high molecular weight copolymer of a mono-organosiloxane and a diorganosiloxane is desired, a mixture of one or more of the salts hereof, together with a salt of a diorganosiloxane, such as the alkali metal salt of tetramethyl disiloxane diol, is progressively neutralized. By this method soluble high polymers have been produced. This avoids the formation of insoluble solids of a portion of the material as frequently occurs during the cohydrolysis of mixed organosilicon halides.

An alternative method for the production of the same type of material involves the interaction of the salts hereof with a mono-organo or diorgano silicon halide. When the relative proportions of diorgano and mono-organo siloxanes desired in the product have been determined, the ratio of mono-organo substituted silicon to alkali which will give a neutral product may be readily computed. Desirable thermosetting resins may be produced by interacting one of the salts hereof with a mono-organo silicon halide. For example, a monophenyl silanol salt may be reacted with monomethyl silicon trihalide. In any instance the one may be added to an excess of the other, and the copolymer so produced may then be washed with water. The amount of excess controls the percent hydroxyl in the copolymer.

The salt complexes above described may be dehydrated to produce the equivalent anhydrous salts. The anhydrous salts may be employed for reaction with organosilicon halides in order to synthesize particular organosiloxanes. Examples of such synthesis are as follows:

(1) 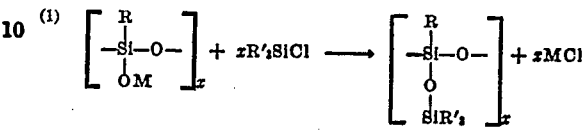

(2) 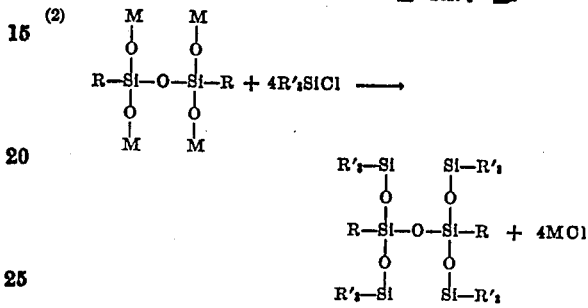

(3) 

The above reactions are typical of the synthetic methods which are possible with the anhydrous salts produced by dehydrating the hydrates obtained in accordance with the method hereof.

Example 1

Hydrates of [CH₃SiOONa]ₓ were prepared as follows. 17.8 parts by weight of methyl triethoxy silane were slowly added to 7.9 parts by weight of saturated aqueous sodium hydroxide. After the methyl triethoxy silane had been added, 19.9 parts by weight of methanol were added to the solution. Upon standing, a white crystalline precipitate was obtained. The neutralization equivalent of this precipitate was 106. The neutralization equivalent indicates that the salt contains 0.5 mol of water per mol of salt. The solution from which the precipitate had been obtained was evaporated yielding a solid material. The neutralization equivalent of this material was 125. The neutral equivalent indicates that the salt contained 1.5 mols of water per mol of salt. The solid material, of neutralization equivalent of 125, upon dehydrating at a temperature of 140° C. over phosphorous pentoxide lost 21% in weight and had a neutralization equivalent of 99.2. The calculated neutralization equivalent of the anhydrous salt is 98.

A borosilicate glass was dipped in a composition comprising 18.9 parts of weight ethanol, 1 part by weight water, and 1 part by weight of the salt having a neutralization equivalent of 106. Upon rinsing, the glass immediately became non-wetting.

Example 2

The hydrated salt of CH₃Si(ONa)₃ was prepared as follows. 17.2 gms. of methyl triethoxy silane were added gradually to 2.16 gms. of water and 23.34 gms. saturated aqueous sodium hydroxide solution. As the silane was added to the sodium hydroxide solution, heat was evolved and some crystals appeared. After standing for 30 minutes, a clear solution was formed. The ethyl alcohol produced was distilled under vacuum and a yellow viscous solution remained. Upon addition of diethyl ether, crystals of the hydrated salt were formed. The neutralization equivalent of hydrate thus produced was 94.4. This neutralization equivalent agrees with that calculated for the hydrate containing 6.8 mols of water per mol of salt. The hydrate of neutralization equivalent 94.4 was dehydrated at 130° C. at 15 mm. pressure over phosphorous pentoxide for 3 hours and had a neutralization equivalent of 59.1. The calculated neutralization equivalent of the anhydrous salt is 53.3.

*Example 3*

A hydrated salt of $(C_2H_5SiOOK)_x$ was prepared as follows. A mixture was made of 17.35 gms. of the hydrolysis product of monoethyl silicon trichloride hydrolyzed in water, 13.46 gms. of potassium hydroxide having a neutralization equivalent of 67.3, 5 gms. of water, and 40 ml. of 95% ethyl alcohol. The mixture was heated until homogeneous. Volatile materials were removed at room temperature at 15 mm. pressure. A crop of small flaky crystals was obtained. These crystals, which were a hydrate, were recrystallized by dissolving in hot toluene and ethyl alcohol and by adding petroleum ether to decrease the solubility of the salt. Large plate crystals were thereby obtained, which had a neutralization equivalent of 183.2. The ratio of silicon to potassium was equal to 1. These data indicate that the hydrated salt contained 3 mols of water per mol of salt.

*Example 4*

A hydrate of $C_2H_5(ONa)_2SiOSi(ONa)_2C_2H_5$ was prepared as follows. A methanol solution of an hydrolyzate of ethyl silicon trichloride which contained 8.1 gms. of ethyl silsesquioxane was added to a saturated solution of sodium hydroxide containing 8 gms. of sodium hydroxide. 10 ml. of methyl alcohol were added to obtain a homogeneous system. Solvent was removed under vacuum, and a dry crumbly salt was obtained which had a neutralization equivalent of 86.4 which indicates that the salt contained roughly 3 mols of water per mol of salt.

*Example 5*

A hydrate of $C_2H_5(OK)_2SiOSi(OK)_2C_2H_5$ was prepared as follows. A mixture was made of 17.35 gms. of an hydrolyzate of ethyl trichlor silane, 55 ml. of 95% ethyl alcohol, 26.92 gms. of potassium hydroxide having a neutralization equivalent of 67.3, and 9 gms. of water. The mixture was homogeneous except for a small amount of gelatinous material which was removed by filtering. The solvent was then removed at a pressure of 15 mm. This is a hydrate of the indicated salt and had the following X-ray diffraction pattern.

| d | I/I₀ |
| --- | --- |
| 7.25 | 1.00 |
| 3.0 | .32 |
| 3.12 | .10 |
| 2.60 | .10 |

*Example 6*

Hydrates of $C_2H_5Si(ONa)_3$ were prepared as follows. Ethyl silicon trichloride was hydrolyzed in water, and the hydrolyzate was dissolved in methanol to give a 50% solution. 16.72 gms. of this solution were mixed with 23.7 gms. of saturated sodium hydroxide solution. This mixture gave a homogeneous system. It was placed under slight vacuum to remove the solvent. A dry powdery salt was obtained which had a neutralization equivalent of 79.5, which shows that the crude hydrate so obtained contained 3.6 mols of water per mol of salt. Upon dehydration, the neutral equivalent dropped to 62.3. The neutralization equivalent of the anhydrous salt by calculation is 58. A portion of the salt which had a neutralization equivalent of 79.5 was dissolved in ethyl alcohol and isopropanol added to cause crystallization. The solution was allowed to stand overnight, whereupon a substantial crop of needle crystals was obtained. This again is the meta salt which has a ratio of one sodium per silicon.

*Example 7*

A hydrated salt of $(C_6H_5SiOONa)_x$ was prepared as follows. Phenyl silicon trichloride was hydrolyzed with water. 132 gms. of the hydrolyzate so produced were mixed with 74.2 gms. of a saturated aqueous solution of sodium hydroxide and 75 ml. of ethyl alcohol. An additional 60 ml. of ethyl alcohol, 60 ml. of water, and 25 ml. of benzene were then added. The mixture was heated to reflux, and a clear solution was obtained. The solvents were removed by distillation, and a salt was obtained. This salt was recrystallized by dissolving it in 150 ml. of toluene, 175 ml. of ethyl alcohol, and 5 ml. of water, at the boiling point. On cooling a crop of crystals was obtained. Diethyl ether was added to the remaining solution, and a second crop of crystals was obtained. The X-ray diffraction pattern which is the same for these two crops of crystals is as follows:

| d | I/I₀ |
| --- | --- |
| 8.55 | 1.00 |
| 3.52 | 0.50 |
| 2.81 | 0.437 |
| 1.96 | 0.400 |
| 2.92 | 0.300 |

The silicon to alkali ratio in these two crops is equal to 1. The neutralization equivalent of the first crop was 214.1 and of the second crop 214.5. This indicates that the salt which was obtained contains 3 mols of water per mol of salt. The salt was dehydrated at increasing temperature levels. Neutralization equivalents and X-ray patterns indicate stepwise transition to at least 3 lower hydrates. The data show that these hydrates are the dihydrate, the monohydrate, and the hemihydrate.

*Example 8*

A hydrated salt of $(C_6H_5SiOOK)_x$ was prepared as follows. A mixture was made of 103.2 gms. of phenyl triethoxy silane, 20 gms. of potassium hydroxide which had a neutralization equivalent of 67.3, and 25 ml. of water. The mixture was heated at 80° C. until homogeneous. Volatile materials were taken off at 15 mm. pressure, initially at room temperature and finally at 50 to 60° C. The volatile components removed were equivalent to 57.1 gms. In the hydrolysis, 58.3 gms. of ethyl alcohol should theoretically be formed. The hydrated salt so obtained was recrystallized from isopropanol by preparing a hot concentrated solution which was cooled. The neutralization equivalent of the salt which crystallized on cooling was 221. This indicates that the salt contains 2.5 mols of water per mol of salt. The crystals were in the form of plates, the predominant faces of which are parallelograms. These crystals are strongly birefringent with a mean index of 1.55. They show oblique extinction with an angle of extinction of 15 to 20°. The X-ray diffraction pattern for this salt is as follows:

| d | I/I₀ |
|---|---|
| 8.75 | 1.00 |
| 3.21 | 0.50 |
| 3.83 | 0.49 |
| 2.70 | 0.42 |
| 4.75 | 0.36 |

*Example 9*

Hydrates of [φSi(ONa)₂]₂O were prepared as follows. 24 gms. of phenyl triethoxy silane were added slowly to 15.8 gms. of a saturated aqueous solution of sodium hydroxide. To the resulting solution, 7.9 gms. of methanol and 5 gms. of water were added. The mixture became a homogeneous system after warming gently. The solution was placed under vacuum by an aspirator at room temperature. The methanol was removed by distillation, and crystals were formed. The neutralization equivalent of the crystals thus formed was 121.2 which corresponds to the calculated neutral equivalent of [φSi(ONa)₂]₂O·5.72H₂O. After 2 hours dehydration under vacuum, the salt has a neutral equivalent of 119.5 which corresponds to the calculated neutral equivalent of

[φSi(ONa)₂]₂O·5.34H₂O

The product was recrystallized by suspending in boiling benzene and adding ethanol until solution takes place. Upon cooling, long needle crystals resulted. After dehydration at 140° C. these crystals had a neutral equivalent of 97.2. The calculated neutral equivalent of the anhydrous salt is 95.5.

*Example 10*

A hydrate of φSi(ONa)₃ was prepared as follows. 24 parts by weight of phenyl triethoxy silane were slowly added to 23 parts by weight of saturated sodium hydroxide solution containing 12 parts by weight sodium hydroxide. The ester was added to the alkali solution over a one hour period. Methanol was added gradually until 11.9 parts by weight had been added. The resulting solution was held under a water vacuum at 125° C. for 10 to 12 hours. At the end of this time 35.3 parts by weight of a white powder were obtained. The neutral equivalent of this white powder was 113.8. This shows that the salt contained between 2 and 2.5 mols of water per sodium atom. The white powder was recrystallized from normal butyl alcohol and diethyl ether. The recrystallized material was dried over phosphorous pentoxide at a temperature of 140° C. for 2 hours and then at 170° C. for 3 hours. At the end of this period the neutralization equivalent of the material was 79.8. The calculated neutralization equivalent of the anhydrous salt is 74. A sodium and silicon analysis of the recrystallized sample indicate that the ratio thereof is equal to 3.

That which is claimed is:

1. The method for the production of salts of mono-organo silanols which comprises interacting the hydrolyzate of a mono-organo silane in which the organic radicals are selected from the group consisting of methyl, ethyl and phenyl and the hydrolyzed radicals are selected from the group consisting of alkoxy and halide with an alkali metal hydroxide in amount between 1 and 3 alkali metal atoms per silicon atom in the presence of between 0.5 and 4 mols of water per atom of alkali metal, and in the presence of an alcohol boiling below water which alcohol is in amount sufficient to dissolve the reactants, and crystallizing from the salt solution so formed a hydrated alkali metal salt of the organosilicon material.

2. The method in accordance with the method of claim 1 in which the ratio of alkali metal atoms to silicon atoms is equal to 1.

3. The method in accordance with the method of claim 1 in which the ratio of alkali metal atoms to silicon atoms is equal to 2.

4. The method in accordance with the method of claim 1 in which the ratio of alkali metal atoms to silicon atoms is equal to 3.

5. The method in accordance with the method of claim 1 in which crystallization is effected by evaporation of alcohol from the reaction mixture.

6. The method for the production of complex alkali metal salts of mono-organosilanols which contain water of hydration, which comprises dissolving an hydrolyzate of a sequisiloxane selected from the class consisting of monophenyl sesquisiloxane, monomethyl sequisiloxane and monoethyl sesquisiloxane, an alkali metal hydroxide in amount between 1 and 3 alkali metal atoms per atom of silicon and water in amount between 0.5 and 4 mols of water per atom of alkali metal in an alcohol containing less than 4 carbon atoms per molecule, whereby a single phase system is obtained, and crystallizing alkali metal salt of the sesquisiloxane from the reaction product whereby a hydrated salt is obtained.

JAMES FRANKLIN HYDE.
OSCAR KENNETH JOHANNSON.